United States Patent [19]

Croisier et al.

[11] 4,115,660

[45] Sep. 19, 1978

[54] TELEPHONE LINE INTERFACING CIRCUIT WITH DIRECTIONAL TRANSFER OF RINGING CURRENT AND OFF-HOOK INDICATIONS

[75] Inventors: Alain Croisier, Cagnes-sur-Mer; Christian Jacquart, Gattiéres, both of France

[73] Assignee: International Business Machines Corporation, Armonk, N.Y.

[21] Appl. No.: 831,329

[22] Filed: Sep. 7, 1977

[30] Foreign Application Priority Data

Oct. 4, 1976 [FR] France .............................. 76 30658

[51] Int. Cl.² .......................................... H04M 3/18
[52] U.S. Cl. ............................ 179/2.5 R; 179/18 HB; 179/84 R
[58] Field of Search .................. 179/2.5 R, 2 C, 84 R, 179/78 R, 1 C, 1 SS, 2.5 A, 170 D, 170 T, 172, 173, 84, 18 HB; 333/78, 79, 27, 80

[56] References Cited

U.S. PATENT DOCUMENTS

| 2,794,857 | 6/1957 | Doriot | 179/2.5 R |
| 3,491,207 | 1/1970 | Birck | 179/2.5 R |
| 3,577,202 | 5/1971 | Brightman | 179/2.5 R |
| 4,011,410 | 3/1977 | Thomas | 179/2.5 R |

Primary Examiner—Thomas A. Robinson
Attorney, Agent, or Firm—Robert Lieber

[57] ABSTRACT

A circuit for interfacing an AF line to a central unit makes use of an RF transformer Tr. Said transformer is so arranged that the source AF signal to be transmitted modulates an RF carrier generated in a primary winding of the transformer and the resulting modulated signal in the secondary winding is demodulated before being transmitted to a line which is thereby linked to the source.

3 Claims, 12 Drawing Figures

TO CENTRAL UNIT

FIG. 2
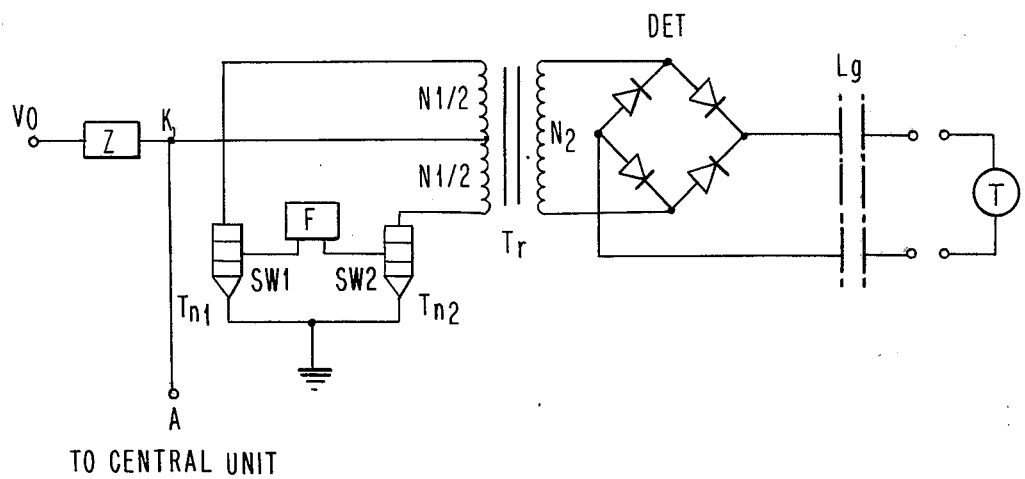
TO CENTRAL UNIT
FIG. 2a
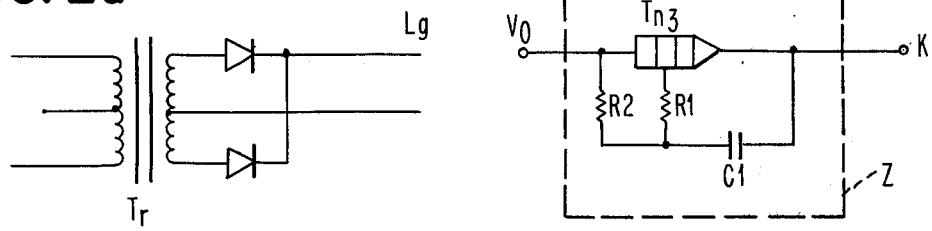
FIG. 2b
FIG. 4
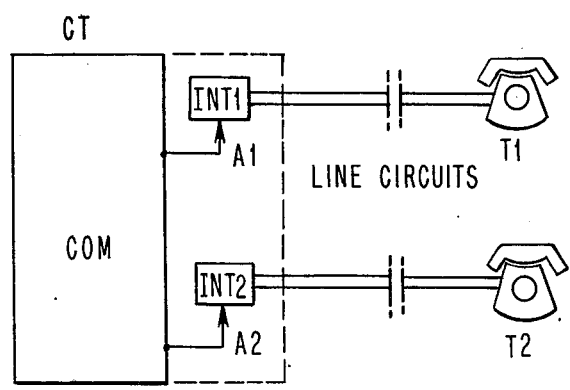
LINE CIRCUITS

TELEPHONE LINE INTERFACING CIRCUIT WITH DIRECTIONAL TRANSFER OF RINGING CURRENT AND OFF-HOOK INDICATIONS

BACKGROUND OF THE INVENTION

This invention concerns circuits for interfacing a central unit and a plurality of remote terminals; it concerns, more particularly, interface circuits for use in telephone systems.

Data processing installations have been increasingly developed which include terminals such as cathode ray tube display devices, teleprinters, telephone sets. etc. connected to central units. When the connection is carried out through wires the use of interface circuits between the line and the central unit is necessary to ensure safety. These circuits include transformers the presence of which raises serious problems in the electronics systems wherein it is desirable to reduce both cumbersomeness and cost.

Many solutions have been proposed to solve these problems. Most of them tend to replace the transformer by an equivalent active circuit and to make use of optoelectronic couplers to ensure the galvanic isolation characteristic of the transformer. Unfortunately, the present state of the technology in this field cannot secure the characteristics of these couplers as to their stability in the course of time, thereby reducing their effectiveness considerably.

The object of this invention is to provide for an interface circuit of small size having stable galvanic isolation.

The foregoing and other features, advantages and objectives of the present invention may be more fully understood and appreciated by considering the following detailed description.

DETAILED DESCRIPTION OF THE DRAWINGS

FIGS. 2, 2a and 2b show in details elements involved in said device according to this invention;

FIG. 4 shows the principle of this invention implemented in a telephone system.

DETAILED DESCRIPTION

As a general rule, the interface circuit should make it possible to transfer an electric signal having a spectrum within a frequency approaching zero to a relatively low audio frequency (AF). The AF transformer is quite adequate to fulfill these functions, but it is bulky. This invention makes it possible to use a transformer of comparatively small size (RF transformer) by employing modulation and demodulation techniques.

Figure 1:
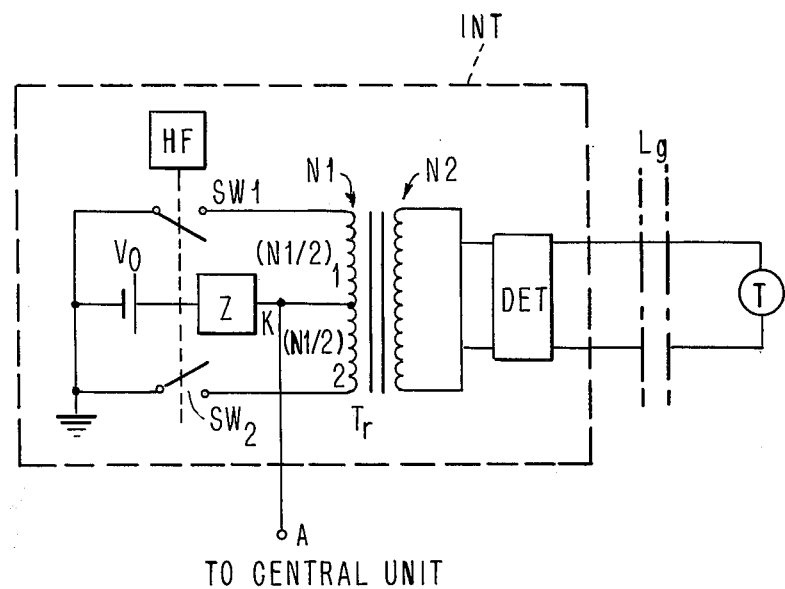
FIG. 1 is a schematic diagram of a device according to this invention.

FIG. 1 illustrates the operating principle of this invention. T represents a terminal utilized to supply and receive AF signals. Lg represents a transmission line connecting to a central unit. INT stands for an interface circuit according to this invention. The useful signal coming from T (or to be transmitted to T) is to be transferred to (or received from) circuit point A which is connected to the central unit. The interface circuit essentially includes an RF transformer (Tr) having a primary winding N1, the ends of which are connected alternately to ground through switches SW1 and SW2, and a secondary winding N2 which drives a rectifier (DET) the output of which is connected to line Lg. The center tap K of primary N1 is connected to point A and to D.C. voltage supply $V_0$. The negative terminal of supply $V_0$ is connected to ground. Switches SW1 and SW2 are closed alternately at the rate of an RF voltage provided by high frequency source HF (for instance, 100 KHz) causing D.C. current from $V_0$ to flow alternately in half-sections $(N1/2)_1$ and $(N1/2)_2$ of winding N1. This creates an RF voltage flow through transformer Tr. In order to avoid loss of the useful signal which appears at point A, and which is intended to pass either to the central unit or to terminal T, in the circuit path of voltage supply $V_0$, a choke impedance Z is placed in series circuit between K and $V_0$.

As shown in FIG. 2, two transformers $T_{n2}$ and $T_{n1}$ can be utilized to fulfill the functions of switches SW1 and SW2. In that case, a free-running multivibrator F, or any other symmetrical source oscillating at the chosen RF frequency, drives the bases of transistors $T_{n1}$ and $T_{n2}$, respectively, in order to turn them on alternately.

Rectifier DET may be of the bridge type, as shown in FIG. 2, or of the two-diode type, as shown in FIG. 2a.

The choke Z can be implemented in many different ways and, more specifically, according to the scheme shown in FIG. 2b wherein a transistor $T_{n3}$ is associated with two resistors R1 and R2 and one capacitor C1.

Figure 3A:
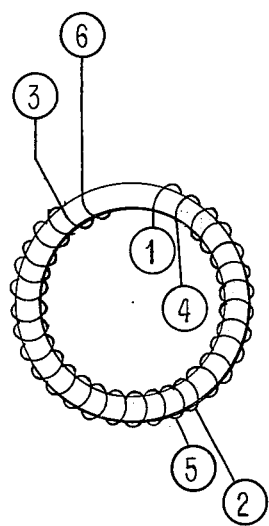
FIGS. 3a and 3b are schematic illustrations of the transformer utilized in the device according to this invention.
Figure 3B:
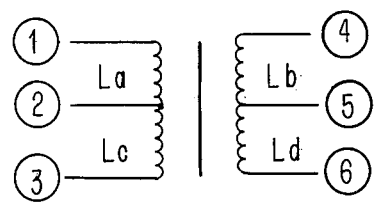

The RF transformer can be implemented through a ferromagnetic core on which primary and secondary windings are wound side by side so as to reduce the leak inductance. The spurious capacitances which result therefrom will be reduced by winding half a primary winding (La, Lc) and half a secondary winding (Lb, Ld) around half the core, the remaining portion being wound around the other half, as shown in FIGS. 3a and 3b.

For transmission from the central unit to terminal T, the AF signal is applied to A, amplitude-modulating the RF carrier wave at the rate of the AF wave. The modulated RF signal, after passing through transformer Tr, is demodulated at DET. The output of rectifier DET is passed, as the useful AF signal, to terminal T through line Lg. For transmission in the opposite direction, i.e., from terminal T to point A, variations in the AF voltage coming from terminal T give rise to a modulation of the RF wave applied to transformer Tr. The modulated signal is almost entirely sent to the central unit in view of the presence of circuit Z which limits the leakage through voltage supply $V_0$. Of course, if need be, an additional filter (not shown in the figure) may be placed between A and the central unit so as to transmit only AF modulation signals.

The above-described interface circuit can be used in many fields. It may be useful when a central unit has to feed terminals with a D.C. voltage. In that case, it suffices that the central unit controls the turning on of the free-running multivibrator F (FIG. 2). The RF signal, which is not modulated since no AF voltage is applied to point A, passes through Tr and is rectified in rectifier DET, to produce a D.C. voltage which corresponds to the envelope of the RF frequency. The humming voltage caused by imperfections in the rectifier may be cancelled by a low-pass analog filter on line Lg, at the output of rectifier DET.

In addition, the use of a plurality of voltage supplies $V_0$ of different magnitudes would cause the generation of RF voltages of different magnitudes which, after detection, would produce several discrete levels. By allocating a digital coded value to each of these levels, there would be obtained a device which could generate and transmit coded information.

The interface circuit of this invention could be implemented as well in the so-called line circuits used in telephone systems. These line circuits are placed in the central system which could be a PBX, and have their voice AF inputs (A) connected to the common switching network (COM), as shown in FIG. 4.

Thus, when two telephone sets T1 and T2 are connected, points A1 and A2, which are the voice inputs to line circuits INT1 and INT2 that are associated with them, respectively, are connected to each other through switching network COM. All of the interface circuits belong to the telephone exchange CT. To fully implement the above-described interface circuit as a telephone line circuit, a few elements must be added to this circuit so that it can fulfill other functions usually assigned to telephone line circuits; namely, the ringing function and the adjustment of the line current.

It is well known that when a telephone exchange has located a called telephone set, it must transmit thereto an A.C. voltage intended to produce ringing sound at the set. Then, when the handset has been taken off hook, the exchange must terminate the sending of the ringing current. These functions are made possible here by connecting the outputs of DET to a ringing bus (R BUS, in FIG. 5), through two 500-ohm resistors $R_{11}$ and $R_{21}$ and a two-contact switch SW3. R BUS is fed by two A.C. voltages V having opposite phases and D.C. components of +48V and −48V, respectively. When telephone set T is called switch SW3, which can be a make-contact reed relay, is closed. The ringing voltage is applied to the line and, therefrom, to the bells of the set the impedance of which corresponds to a capacitance C (0.5 to 2μF) series-mounted with a resistor R (3Kω, for instance). FIG. 5a shows an equivalent diagram wherein $V_0$ stands for the A.C. voltage resulting from the combination ±V, $V_{o'}$ stands for the absolute value of the D.C. voltage of 48 volts on each line of the R bus, and RL stands for the line resistance. The presence of C prevents a D.C. component from flowing through the circuit; no D.C. voltage drop appears across $R_{11}$ and $R_{21}$, and voltage $2V_{o'}$ appears at the terminals BB' of the rectifier bridge. Because of the polarity of this voltage, the bridge is blocked, thereby preventing the ringing power from reaching the switching network and, likewise, preventing RF signals from passing through the transformer. No current is flowing through center tap K of the primary winding.

When the called telephone set has its handset taken off hook, the ringing impedance is replaced by a resistor Rp with a value of about 100 ohms. The line current then has a D.C. component which entails a voltage drop so that the D.C. voltage at the terminals BB' becomes $$V_{BB'} = 2 V_{O'} \frac{R_L + R_p}{R_L + R_p + R_{11} + R_{21}} \quad (10)$$

This voltage drop causes the diode bridge to become conducting, thereby allowing the RF frequency to go through the transformer, which results in a current flowing through center tap K. The presence of this current denotes that the handset of the called set is off hook, and makes it possible to control the operation which consists in turning switch SW3 off. This is a very simple way of achieving "off-hook" detection in the presence of the ringing signal.

Figure 6:
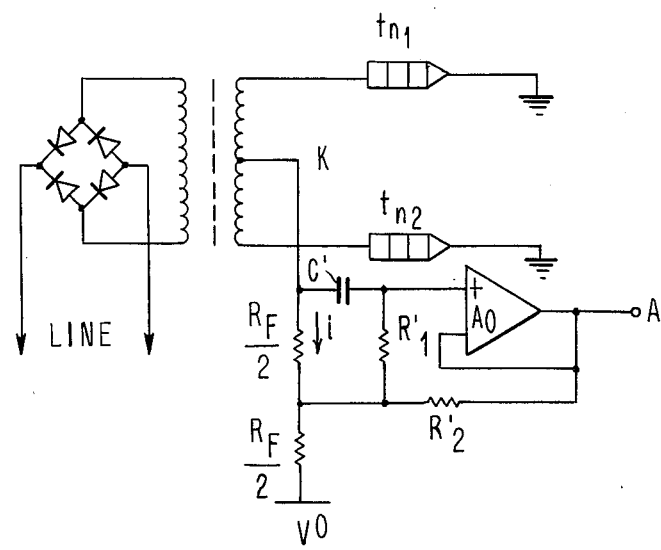

As mentioned above, it must be possible with the telephone line circuit to adjust the D.C. line current to standardized values. Conventional interface circuits for this purpose have so-called feeders comprised of resistors. Here also, the same technique may be used. A resistor $R_F$ may be placed between center tap K of the primary winding of transformer Tr and supply $V_0$; i.e., this resistor may be in series with choke Z. But other better arrangements could be conceived. In the arrangement shown in FIG. 6, the feeder is divided into two portions $R_{F/2}$. Portion $R_{F/2}$ nearer to point K is placed at the terminal of a circuit including operational amplifier $A_0$, capacitor C', and two resistors R'1 and R'2. This arrangement is of the so-called bootstrap type and makes it possible to feed the AF signal recovered at point K, back into the midpoint of the feeder, so that the AF current in the feeder tends toward zero. This circuit, therefore, fulfills the functions of both the feeder and choke Z.

Figure 7:
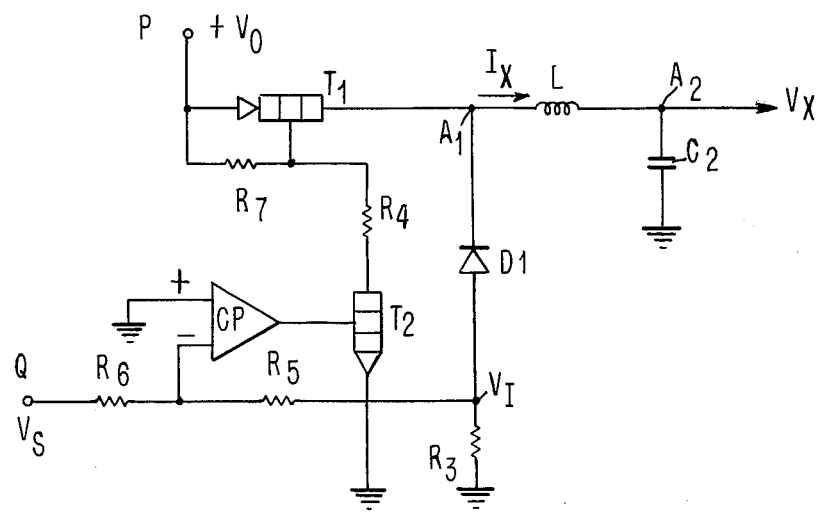
Figure 7A:
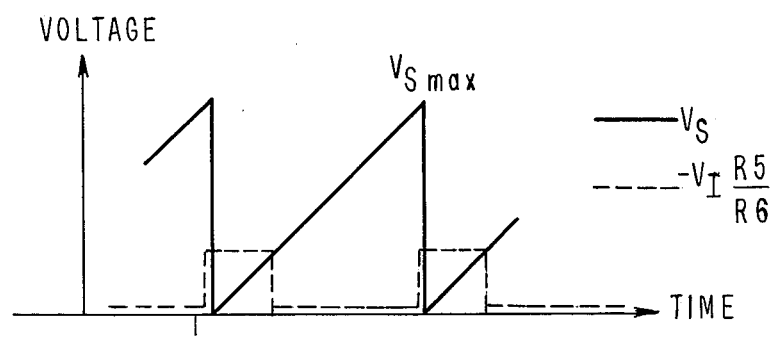

Known feeder circuits have a drawback in that they dissipate a relatively significant amount of power (about 1.3 watts as an average). This is a drawback particularly when high circuit density is desired. Hence, the value of a non-dissipative feeder, such as the one shown in FIG. 7 is obvious. This circuit is essentially comprised of a π-cell including self inductance L, capacitor C2 and diode D1 series-mounted with a resistor R3. Point A1, common to L and D1, is connected to a switching transistor T1 of the PNP type. The emitter of T1 is connected to the terminal P of the voltage supply $V_0$ as well as to the base of T1, through a resistor R7. The base of T1 is, in addition, connected to ground, through resistor R4 and NPN transistor T2. The base of T2 is driven by an operational amplifier CP (a comparator) the non-inverting input of which is grounded, its inverting input being connected to an input Q, through a resistor R6. The inverting input, in addition, is connected to ground, through R3 which is series-mounted with R5. Upon application of sawtooth voltage $V_S$ (FIG. 7a) to terminal Q, comparator CP, which is operated upon effect of the combination of $V_S$ with voltage $V_1$ appearing across R3, controls the turning off of T2, and therefore of T1. This makes it possible to apply $V_0$ switchably to point A1. Voltages ($V_X$) and current ($I_X$) coming from this feeding circuit, comply with relationship:

$$V_X = V_O - \left( \frac{R_6}{R_5} \cdot \frac{V_O}{V_{X max}} \cdot R_3 \right) I_X$$

This shows that the circuit behaves as a pure resistor, $$R_{eq} = \frac{R_6}{R_5} \cdot \frac{V_O}{V_{S max}} \cdot R_3,$$

which is series-mounted with voltage supply $V_0$.

Figure 5:
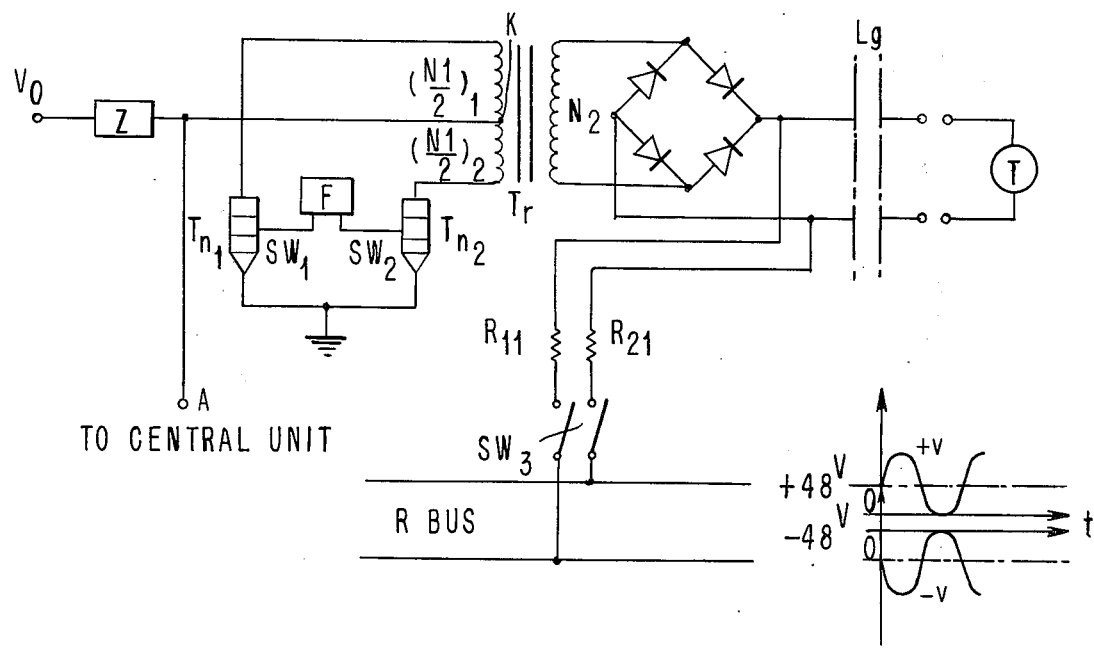
FIGS. 5, 5a, 6, 7 and 7a show details of elements involved in the application of this invention to telephone systems.
Figure 5A:
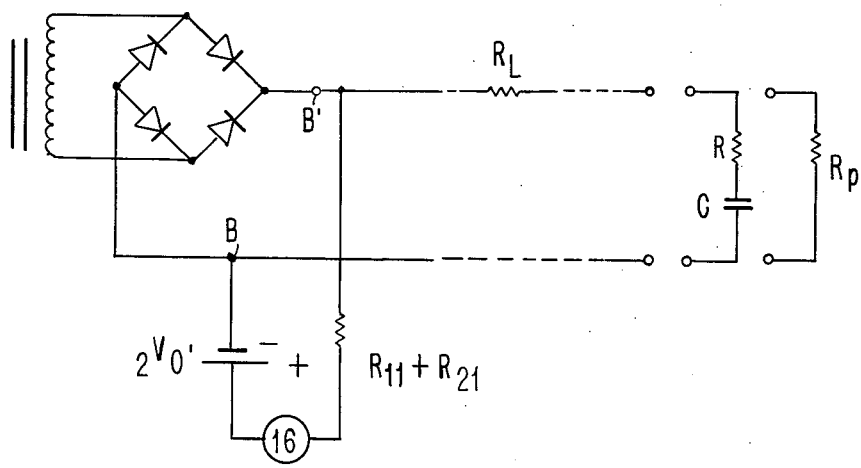

In order to insert this feeding circuit into the interface circuit according to this invention and implemented in a telephone system, it suffices to connect the output point A2 to the input of impedance Z; in other words, it suffices to place the feeder between $V_0$ and Z (see FIG. 5).

While the invention has been particularly shown and described with reference to a preferred embodiment thereof, it will be understood by those skilled in the art that various changes in form and detail may be made therein without departing from the spirit and scope of the invention.

What is claimed is:

1. A circuit for interfacing a telephone exchange having a source of ringing current with a line connected to a telephone set having a ringing bell facility, said facility subject to audible actuation by said ringing current, said interface circuit comprising:

sources of RF carrier signals, D.C. voltage and ground voltage;

an RF transformer having a center-tapped primary winding and a secondary winding;

means responsive to said RF carrier signals for connecting ends of said primary winding to said ground voltage alternately at the frequency of said RF carrier signals;

means connecting the center tap of said primary winding to said exchange for effectively superimposing voice frequency signals on said carrier signals in said primary winding;

means coupling said center tap to said D.C. voltage through a series impedance effective to prevent voice frequency signals from passing through said source of D.C. voltage;

detection means coupling ends of said secondary winding to said line for transferring voice frequency signals between said exchange and said line while preventing said RF carrier signals from reaching said line;

means for coupling said ringing current to said line, including a disconnection switch controllable by said exchange and an impedance in series with said switch, said impedence related to the impedance presented to said line by said telephone set in the off-hook state;

said detection means being conditioned to prevent passage of any signals between said exchange and said line when said ringing current is coupled to said set and said set is in the on-hook state;

said detection means further being responsive to the impedance change in said set accompanying the transition of said set from on-hook state to off-hook state, even when ringing current is present on said line, for passing a signal to said exchange uniquely indicative of said transition; said uniquely indicative signal being useful to actuate said exchange to control said disconnection switch to disconnect said ringing current from said line and thereby from said set.

2. An interfacing circuit in accordance with claim 1 wherein said impedance coupling said center tap to said D.C. voltage comprises a resistive feeder shunted by a bootstrap circuit effective to attenuate voice frequency signals entering said feeder at said center tap.

3. A telephone interfacing circuit according to claim 1, wherein said inpedance coupling said center tap to said D.C. voltage includes a feeding device comprised of:

a $\pi$-cell having two vertical branches and one horizontal branch; the horizontal branch comprised of a self inductance, the vertical branches being comprised of a capacitance in one branch and a diode in series with a resistance in the other branch;

a switch for applying a D.C. voltage to said $\pi$-cell;

a comparator for combining the voltage which appears across said resistance with a sawtooth voltage; and control means for controlling the turning on of said switch by means of said comparator.

* * * * *